(12) United States Patent
Capar et al.

(10) Patent No.: US 10,014,918 B2
(45) Date of Patent: Jul. 3, 2018

(54) SYSTEMS AND METHODS FOR BEAM SELECTION FOR HYBRID BEAMFORMING

(71) Applicant: Telefonaktiebolaget LM Ericsson (publ), Stockholm (SE)

(72) Inventors: Cagatay Capar, Santa Clara, CA (US); Songnam Hong, Cupertino, CA (US); Dennis Hui, Sunnyvale, CA (US); Guido Hiertz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/188,617

(22) Filed: Jun. 21, 2016

(65) Prior Publication Data
US 2017/0078004 A1    Mar. 16, 2017

Related U.S. Application Data

(60) Provisional application No. 62/217,878, filed on Sep. 12, 2015.

(51) Int. Cl.
*H04B 7/06*    (2006.01)
*H04B 7/0456*   (2017.01)
(Continued)

(52) U.S. Cl.
CPC ......... *H04B 7/0456* (2013.01); *H01Q 1/1257* (2013.01); *H04B 7/0617* (2013.01);
(Continued)

(58) Field of Classification Search
CPC ............... H04B 7/04; H04B 7/06; H04B 7/08
See application file for complete search history.

(56) References Cited

U.S. PATENT DOCUMENTS

2011/0110453 A1  5/2011 Prasad et al.
2012/0130981 A1  5/2012 Risvik et al.
(Continued)

OTHER PUBLICATIONS

Rahman, MD. Saifur, et al., "Low Complexity RF Beam Search Algorithms for Millimeter-Wave Systems," Globecom 2014—IEEE Global Communications Conference, Dec. 8-12, 2014, Austin, Texas, IEEE, pp. 3815-3820.

(Continued)

*Primary Examiner* — Jaison Joseph
(74) *Attorney, Agent, or Firm* — Withrow & Terranova, PLLC

(57) ABSTRACT

Systems and methods of beam selection for hybrid beamforming are disclosed. Determining a select set of beam indices for use with transmissions to a receiver using hybrid precoding includes obtaining metrics for a first set of pairs of beam indices for use with the transmissions, where each pair includes a transmit beam index for a transmit antenna and a receive beam index for a receiver antenna. The method also includes selecting a first subset of the first set of pairs according to a first pruning decision, where the first subset includes at least one of the pairs. The method also includes processing only the first subset to determine the selected set of beam indices for use with the transmissions using hybrid precoding. In this way, a beam selection is made without the need to perform an exhaustive search of beams which is typically a time consuming process.

17 Claims, 10 Drawing Sheets

(51) Int. Cl.
*H01Q 1/12* (2006.01)
*H04W 16/28* (2009.01)
*H04B 7/08* (2006.01)

(52) U.S. Cl.
CPC ......... *H04B 7/0639* (2013.01); *H04B 7/0686* (2013.01); *H04B 7/0695* (2013.01); *H04B 7/088* (2013.01); *H04B 7/0868* (2013.01); *H04W 16/28* (2013.01)

(56) References Cited

U.S. PATENT DOCUMENTS

2014/0334564 A1* 11/2014 Singh ................... H04B 7/0413
    375/267
2014/0337255 A1   11/2014 Eads
2014/0341310 A1   11/2014 Rahman et al.

OTHER PUBLICATIONS

International Search Report and Written Opinion for PCT/IB2016/055387, dated Dec. 12, 2016, 11 pages.

* cited by examiner

SYSTEMS AND METHODS FOR BEAM SELECTION FOR HYBRID BEAMFORMING

RELATED APPLICATIONS

This application claims the benefit of provisional patent application Ser. No. 62/217,878, filed Sep. 12, 2015, the disclosure of which is hereby incorporated herein by reference in its entirety.

TECHNICAL FIELD

The present disclosure relates to hybrid beamforming in wireless communication.

BACKGROUND

Devices based on Institute of Electrical and Electronics Engineers (IEEE) 802.11ad standard for the 60 Gigahertz (GHz) millimeter Wave (mmW) frequency band are being deployed in conjunction with IEEE 802.11 devices operating in frequencies below 6 GHz to provide improved user experience and expand the market for Wireless Local Area Networks (WLANs). Despite the enhanced capacity provided by the IEEE 802.11ad directional multi-gigabit devices, wireless LAN usages continue to grow and find new applications demanding additional capacity. For example, it is highly desirable to replace wired interfaces such as Ethernet, High-Definition Multimedia Interface (HDMI), Universal Serial Bus (USB), and DisplayPort whose speed can far exceed 10 Gigabits per second (Gbps) with wireless interfaces. In addition, there are other usages such as cellular offload, wireless docking, wireless display, and outdoor/indoor wireless backhaul. Therefore, there is a need to substantially increase the achievable throughput of IEEE 802.11ad devices and the overall capacity of IEEE 802.11 deployments, which is the main goal of the new IEEE 802.11ay amendment. In particular, Multiple-Input Multiple-Output (MIMO) transmission is considered as a key technology in IEEE 802.11ay to improve the data throughput of IEEE 802.11ad.

In some instances, an mmW communication system (e.g., IEEE 802.11ad) is operating with high number of antennas and very limited number of analog Radio Frequency (RF) chains. A large number of antennas is used to extend the communication range for recovering the high path loss, while fewer analog RF chains are designed to reduce transmission, processing power, and hardware complexity. Due to the limited number of RF chains, the digital signal processor at Baseband (BB) frequency cannot apply individual fast-changing precoding weight or antenna weight to every antenna element to achieve the conventional fully digital precoding for MIMO transmissions at the transmitter or the conventional fully digital coherent combining at the receiver. Instead, only a slow-changing phase shift can be applied to each individual antenna element at the RF front-end to steer a beam towards the desired direction for each RF chain. Such a slow beam steering mechanism is commonly referred to as analog Beamforming (BF). On the other hand, the digital processor can apply a fast-changing precoding weight at BB to each RF chain. The application of such precoding weight per RF chain is referred to as baseband precoding. The combination of the analog BF and baseband precoding is commonly called hybrid beamforming.

Before any communication starts between two devices, the devices need to align their beam pointing angles towards each other. An efficient searching process to identify the best beam angle pair (a transmit beam and a receive beam) is therefore needed. This process is called beam training, which typically takes a significant amount of time to complete due to the numerous possible different combinations of transmit and receive beam directions to scan through. Due to there only being one active RF chain on both the transmitter and the receiver (limiting the transmission to a single stream), beam selection criterion is clear, i.e., finding a beam pair to maximize the received signal power. In IEEE 802.11ay (enhanced version of IEEE 802.11ad), however, hybrid precoding will be used to multiplex several data streams together, thereby improving throughput. This will require that more than one RF chain can be active at the transmitter and/or the receiver, which will further increase the number of beam combinations of transmit and receive beam directions to scan through.

Therefore, there is a need for determining a select set of beam indices for use with transmissions from a transmitter to a receiver using hybrid precoding.

SUMMARY

Systems and methods of beam selection for hybrid beamforming are disclosed. In some embodiments, a method of determining a select set of beam indices for use with transmissions from a transmitter to a receiver using hybrid precoding includes obtaining one or more metrics for a first plurality of pairs of beam indices for use with the transmissions from the transmitter to the receiver, where each pair of beam indices includes a transmit beam index for an antenna of the transmitter and a receive beam index for an antenna of the receiver. The method also includes selecting a first subset of the first plurality of pairs of beam indices according to a first pruning decision, where the first subset includes at least one of the first plurality of pairs of beam indices. The method also includes processing only the first subset of the first plurality of pairs of beam indices to determine the selected set of beam indices for use with the transmissions from the transmitter to the receiver using hybrid precoding. In this way, a beam selection is made without the need to perform an exhaustive search of beams, which is typically a time consuming process.

In some embodiments, processing only the first subset of the first set of pairs of beam indices to determine the selected set of beam indices for use with the transmissions from the transmitter to the receiver using hybrid precoding includes obtaining one or more metrics for a second set of pairs of beam indices for use with the transmissions from the transmitter to the receiver for the pairs of beam indices in the first subset of the first set of pairs of beam indices, where each pair of beam indices in the second plurality of pairs of beam indices together with a respective one of the pairs of beam indices in the first subset of the first set of pairs of beam indices forms a potential set of beam indices. The method also includes selecting a second subset of the second set of pairs of beam indices according to a second pruning decision, where the second subset includes at least one but not all of the second set of pairs of beam indices and processing only the second subset of the second set of pairs of beam indices to determine the selected set of beam indices for use with the transmissions from the transmitter to the receiver using hybrid precoding.

In some embodiments, processing only the second subset of the second set of pairs of beam indices to determine the selected set of beam indices for use with the transmissions from the transmitter to the receiver using hybrid precoding includes selecting the potential set of beam indices that maximizes an overall predefined metric.

In some embodiments, obtaining the one or more metrics for the first set of pairs of beam indices and selecting the first subset of the first set of pairs of beam indices are included in determining a first level of a decision tree, obtaining the one or more metrics for the second set of pairs of beam indices and selecting the second subset of the second set of pairs of beam indices are included in determining a second level of the decision tree; and processing only the second subset of the second set of pairs of beam indices to determine the selected set of beam indices for use with the transmissions from the transmitter to the receiver using hybrid precoding includes determining one or more additional levels of the decision tree.

In some embodiments, the second set of pairs of beam indices for use with transmissions from the transmitter to the receiver includes multiple groups of pairs of beam indices where each group of the multiple groups of pairs of beam indices corresponds to a respective one of the pairs of beam indices in the first subset of the first set of pairs of beam indices.

In some embodiments, selecting the first subset of the first set of pairs of beam indices according to the first pruning decision comprises selecting a predefined number, M, of the first set of pairs of beam indices that have the most favorable values of a first predefined metric for the first set of pairs of beam indices.

In some embodiments, selecting the first subset of the first set of pairs of beam indices according to the first pruning decision includes selecting the first subset of the first plurality of pairs of beam indices using prior information regarding the first set of pairs of beam indices. In some embodiments, the prior information regarding the first plurality of pairs of beam indices includes an indication of one or more known good pairs of the first set of pairs of beam indices, and selecting the subset of the first set of pairs of beam indices also includes including the one or more known good pairs. In some embodiments, the prior information regarding the first set of pairs of beam indices includes an indication of one or more known bad pairs of the first set of pairs of beam indices and selecting the first subset of the first plurality of pairs of beam indices also includes excluding the one or more known bad pairs. In some embodiments, the prior information regarding the first set of pairs of beam indices includes a weighting factor for one or more pairs of the first set of pairs of beam indices, and selecting the first subset of the first set of pairs of beam indices also includes selecting a predefined number, M, of the first set of pairs of beam indices that have the most favorable values of a first predefined metric for the first set of pairs of beam indices where the values of the first predefined metric are weighted with the weighting factor for the one or more pairs.

In some embodiments, identifying the first set of pairs of beam indices includes searching all of the pairs of beam indices. In some embodiments, identifying the second set of pairs of beam indices includes searching all of the pairs of beam indices based on the first subset of the first set of pairs of beam indices.

In some embodiments, at least the first predefined metric for the first set of pairs of beam indices is different from the second predefined metric for the set of beam indices. In some embodiments, the first predefined metric is an indication of a signal strength for the transmission mode. In some embodiments, the first predefined metric is an indication of a data throughput for the transmission mode.

In some embodiments, the transmitter and the receiver operate using a millimeter wave technology. In some embodiments, the transmitter and the receiver operate according to the IEEE 802.11ay standard.

In some embodiments, a receiver includes multiple antennas and circuitry. The circuitry is configured to obtain one or more metrics for a first set of pairs of beam indices for use with transmissions from the transmitter to the receiver, where each pair of beam indices includes a transmit beam index for an antenna of the transmitter and a receive beam index for an antenna of the receiver. The circuitry is also configured to select a first subset of the first set of pairs of beam indices according to a first pruning decision, where the first subset includes at least one but not all of the first set of pairs of beam indices; and process only the first subset of the first set of pairs of beam indices to determine the selected set of beam indices for use with the transmissions from the transmitter to the receiver using hybrid precoding.

In some embodiments, a non-transitory computer readable medium stores software instructions that when executed by a processor of a receiver cause the receiver to obtain one or more metrics for a first set of pairs of beam indices for use with transmissions from the transmitter to the receiver, where each pair of beam indices includes a transmit beam index for an antenna of the transmitter and a receive beam index for an antenna of the receiver; select a first subset of the first set of pairs of beam indices according to a first pruning decision, where the first subset includes at least one but not all of the first set of pairs of beam indices; and process only the first subset of the first set of pairs of beam indices to determine the selected set of beam indices for use with the transmissions from the transmitter to the receiver using hybrid precoding.

In some embodiments, a receiver is adapted to obtain one or more metrics for a first set of pairs of beam indices for use with transmissions from the transmitter to the receiver, where each pair of beam indices includes a transmit beam index for an antenna of the transmitter and a receive beam index for an antenna of the receiver; select a first subset of the first set of pairs of beam indices according to a first pruning decision, where the first subset includes at least one but not all of the first set of pairs of beam indices; and process only the first subset of the first set of pairs of beam indices to determine the selected set of beam indices for use with the transmissions from the transmitter to the receiver using hybrid precoding.

In some embodiments, a computer program includes instructions which, when executed on at least one processor, cause the at least one processor to carry out any of the preceding methods. In some embodiments, a carrier contains the computer program, wherein the carrier is one of an electronic signal, an optical signal, a radio signal, or a computer readable storage medium.

In some embodiments, a receiver includes a beam index pair identifying module operative to obtain one or more metrics for a first set of pairs of beam indices for use with transmissions from the transmitter to the receiver, where each pair of beam indices includes a transmit beam index for an antenna of the transmitter and a receive beam index for an antenna of the receiver; and a beam index pair pruning module operative to select a first subset of the first set of pairs of beam indices according to a first pruning decision, where the first subset includes at least one but not all of the first set of pairs of beam indices and process only the first subset of the first set of pairs of beam indices to determine the selected set of beam indices for use with the transmissions from the transmitter to the receiver using hybrid precoding.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
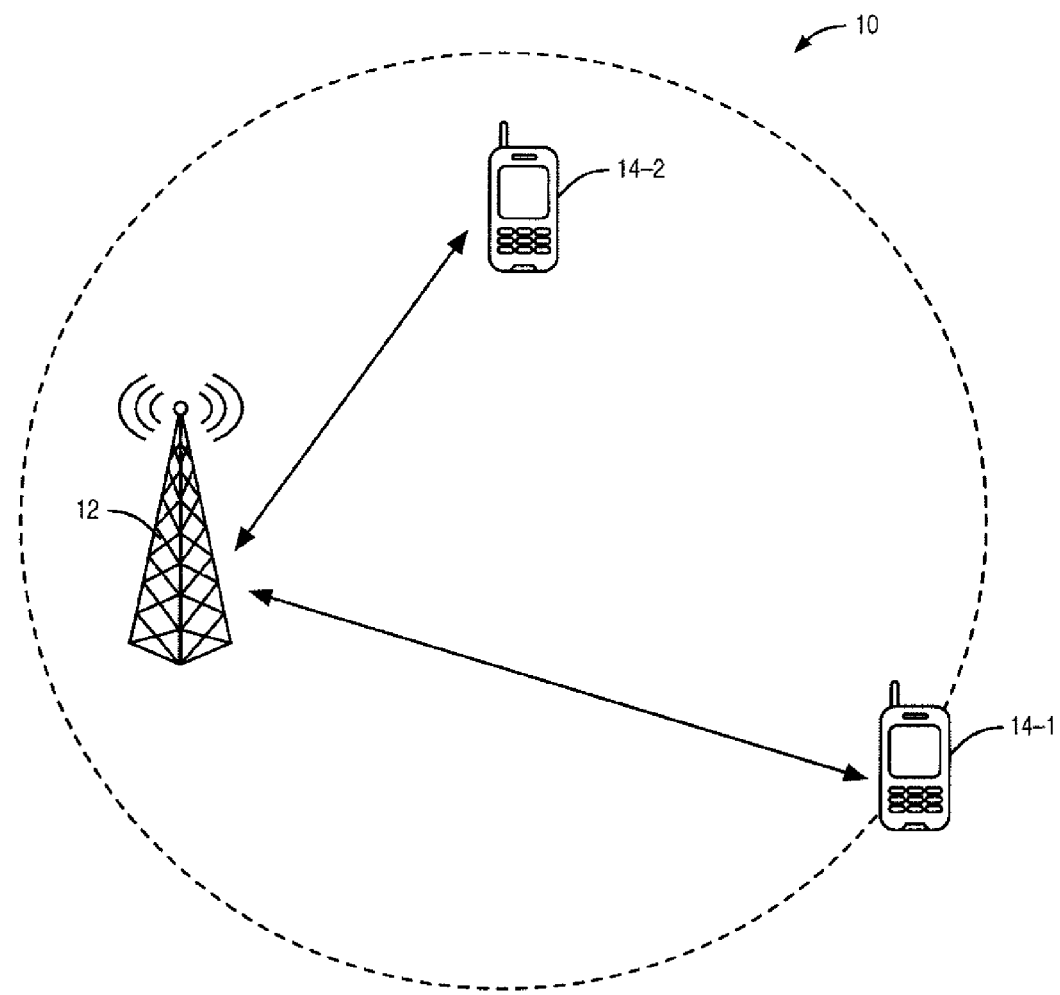
FIG. 1 illustrates a wireless communication network with multiple wireless devices and a network node, according to some embodiments of the present disclosure.

FIG. 1 illustrates a wireless communication network 10 with a transmitter 12 and multiple receivers 14-1 and 14-2, according to some embodiments of the present disclosure. In some embodiments herein, the receivers 14-1 and 14-2 (sometimes referred to herein as receiver 14 and receivers 14) are wireless devices, and the transmitter 12 is a network node. While the terms transmitter and receiver may seem like one-way communication, the present disclosure is not limited thereto. In fact, the transmitter 12 may also receive communications from the receiver 14. Therefore, any discussion herein regarding a transmitter 12 may be equally applicable to a receiver 14 and vice versa.

Notably, much of the discussion herein focuses on embodiments in which the wireless communication network 10 is an Institute of Electrical and Electronics Engineers (IEEE) 802.11ay standard for the 60 Gigahertz (GHz) millimeter Wave (mmW) network. As such, IEEE terminology is oftentimes used herein. However, while the embodiments described herein focus on IEEE 802.11ay, the embodiments and concepts disclosed herein may be used in any suitable type of existing or future wireless communication network including, for example, $3^{rd}$ Generation (3G) networks (e.g. Universal Mobile Telecommunications System (UMTS)), $4^{th}$ Generation (4G) networks (Worldwide Interoperability for Microwave Access (WiMAX), Long Term Evolution (LTE), Long Term Evolution Advanced (LTE-A)), $5^{th}$ Generation (5G) or other future networks.

In FIG. 1, transmitter 12 is shown serving a first receiver 14-1 and a second receiver 14-2. In this example, receiver 14-1 is on or near the border of transmissions from transmitter 12. As such, receiver 14-1 might be able to obtain a better signal by using beamforming to communicate with the transmitter 12.

As discussed above, in some instances, wireless communication network 10 (e.g., IEEE 802.11ad or IEEE 802.11ay) is operating with a high number of antennas and very limited number of analog Radio Frequency (RF) chains. A large number of antennas is used to extend the communication range for recovering the high path loss while fewer analog RF chains are designed to reduce transmission, processing power, and hardware complexity. Due to the limited number of RF chains, the digital signal processor at Baseband (BB) frequency cannot apply individual fast-changing precoding weight or antenna weight to every antenna element to achieve the conventional fully digital precoding for MIMO transmissions at the transmitter or the conventional fully digital coherent combining at the receiver. Instead, only a slow-changing phase shift can be applied to each individual antenna element at the RF front-end to steer a beam towards the desired direction for each RF chain. Such a slow beam steering mechanism is commonly referred to as analog Beamforming (BF). On the other hand, the digital processor can apply a fast-changing precoding weight at BB to each RF chain. The application of such precoding weight per RF chain is referred to as baseband precoding. The combination of the analog BF and baseband precoding is commonly called hybrid beamforming.

Figure 2:
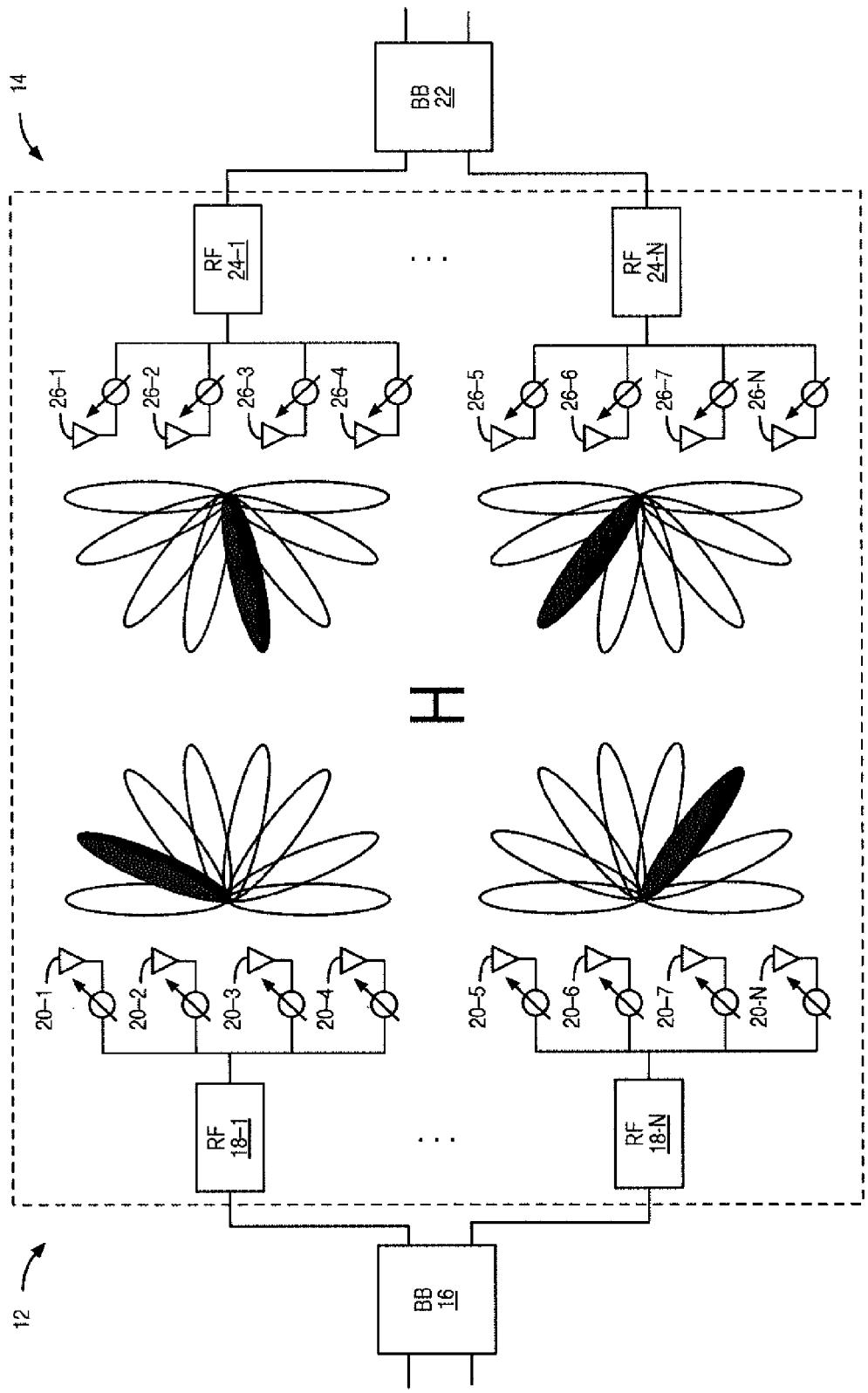
FIG. 2 is a schematic diagram of a transmitter and receiver employing hybrid beamforming, according to some embodiments of the present disclosure.

FIG. 2 is a schematic diagram of a transmitter 12 and receiver 14 employing hybrid beamforming, according to some embodiments of the present disclosure. As shown, transmitter 12 includes a BB processing module 16 which connects to multiple RF chains 18-1 through 18-N. Each RF chain 18 includes one or more antennas 20-1 through 20-N. The receiver 14 similarly includes a BB processing module 22 which connects to multiple RF chains 24-1 through 24-N. Each RF chain 24 includes one or more antennas 26-1 through 26-N.

As discussed above, a slow-changing phase shift can be applied to each individual antenna element 20, 26 at the RF front-end to steer a beam towards the desired direction for each RF chain 18, 24. Examples of potential beam directions are shown as elongated ellipses. The darkened ellipses indicate the current beam direction for the antennas of that particular RF chain 18, 24. The concatenation of the physical channel and the analog beamformer forms an effective composite channel between BB 16 and BB 22 as denoted by H.

Before any communication starts between two devices such as transmitter 12 and receiver 14, the devices need to align their beam pointing angles towards each other. An efficient searching process to identify the best beam angle pair (a transmit beam and a receive beam) is therefore needed. This process is called beam training, which typically takes a significant amount of time to complete due to the numerous possible different combinations of transmit and receive beam directions to scan through. Due to the transmission of a single stream, beam selection criterion is clear for IEEE 802.11ad, i.e., finding a beam pair to maximize the received signal power. In IEEE 802.11ay (enhanced version of IEEE 802.11ad), however, hybrid precoding is used to multiplex several data streams together, thereby improving data throughput. This will further increase the number of beam combinations of transmit and receive beam directions to scan through. Therefore, there is a need for determining a select set of beam indices for use with transmissions from a transmitter to a receiver using hybrid precoding.

In some embodiments, a set of beam indices is an ordered tuple of beam indices. As an example, a set of beam indices indicating (7,5) (i.e., "use beam number 7 for the transmit antenna array number 1, and use beam number 5 for the transmit antenna array number 2") is different than indicating (5,7) (i.e., "use beam number 5 for the transmit antenna array number 1, and use beam number 7 for the transmit antenna array number 2"). Also, in some embodiments one or more of the beam indices may be a NULL beam index to indicate that a particular transmit antenna array should not be used. For example, indicating (NULL, 5) may mean "do not transmit from antenna array number 1; transmit only from transmit antenna array number 2, and use beam number 5 on that array." A NULL beam index may be indicated in various ways depending on implementation.

For example, in an 802.11ad scenario with one transmit array and one receiver array, where each array selects a beam from a beam codebook of size 16, beam selection requires $16^2$ (256) calculations. The number of calculations in a 2×2 MIMO 802.11ay scenario with two RF chains on both sides goes up to $16^4$ (65,536). In general, beam selection requires a number of computations that scale exponentially in the number of antenna arrays. This may be infeasible in practice as the number of RF chains can be large. Therefore, more efficient beam search algorithms that run faster than exhaustive search but still achieve close performance are of interest. One suboptimal but faster algorithm is to do a pairwise search instead of an exhaustive search. However, matching antenna arrays one pair at a time has the potential to perform poorly, as fixing one beam pair at one stage of the pairwise search has the potential to lead the rest of the search towards a significantly suboptimal path.

Figure 3:
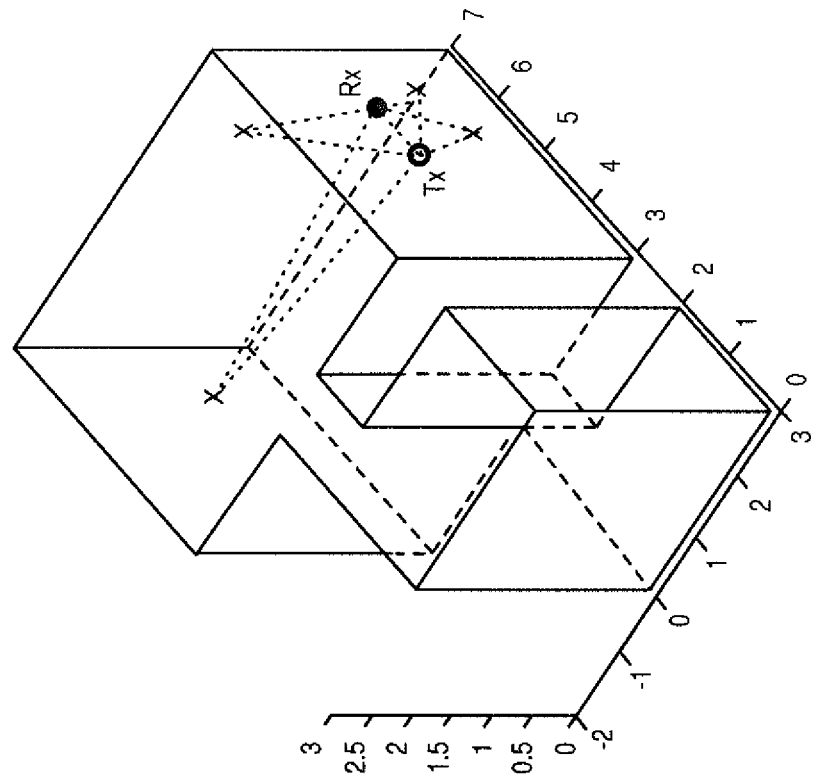
FIG. 3 illustrates an indoor environment and antenna configurations used for simulations of communication between a transmitter and a receiver, according to some embodiments of the present disclosure.
Figure 3:
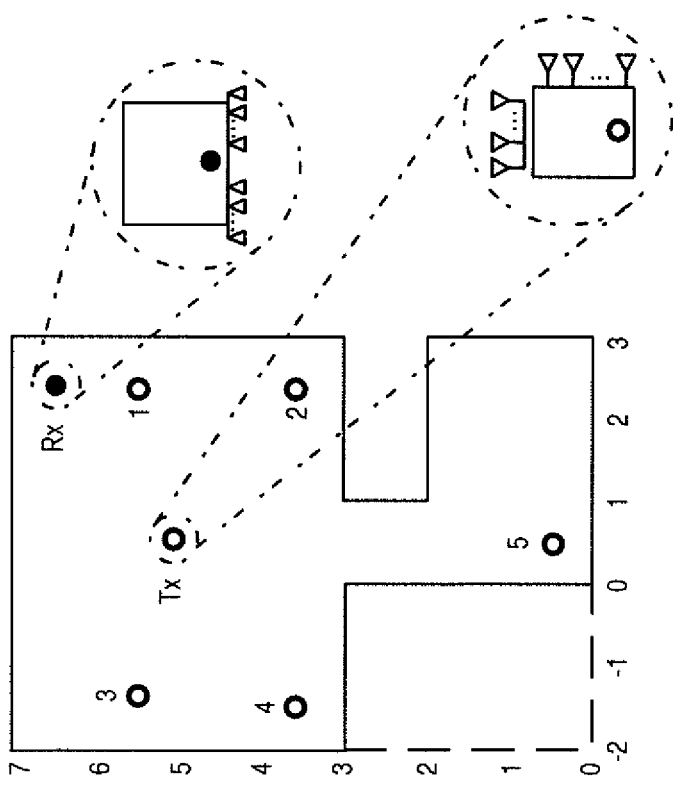

As an example need for beamforming, FIG. 3 illustrates an indoor environment and antenna configurations used for simulations of communication between a transmitter 12 and a receiver 14, according to some embodiments of the present disclosure. In this example, a studio apartment room plan is shown with transmitter 12 shown as Tx and receiver 14 shown as Rx. As illustrated, both the transmitter 12 and receiver 14 include multiple antennas that can be pointed in various directions to transmit and receive, respectively.

The left side of FIG. 3 illustrates five different transmission locations for the transmitter 12. The right side of FIG. 3 illustrates possible paths to the receiver 14 based on the different beam directions. Some directions do not even result in the signal being received at the receiver 14. Other beam directions result in reception after being reflected off a surface such as a wall. Determining the best beam directions can greatly increase data throughput.

Systems and methods of beam selection for hybrid beamforming are disclosed. In some embodiments, a method of determining a select set of beam indices for use with transmissions from a transmitter to a receiver using hybrid precoding includes obtaining one or more metrics for a first plurality of pairs of beam indices for use with the transmissions from the transmitter to the receiver, where each pair of beam indices includes a transmit beam index for an antenna of the transmitter and a receive beam index for an antenna of the receiver. As used herein, the term "antenna" may also refer to an "antenna array." The method also includes selecting a first subset of the first plurality of pairs of beam indices according to a first pruning decision, where the first subset includes at least one but not all of the first plurality of pairs of beam indices. The method also includes processing only the first subset of the first plurality of pairs of beam indices to determine the selected set of beam indices for use with the transmissions from the transmitter to the receiver using hybrid precoding. In this way, a beam selection is made without the need to perform an exhaustive search of beams which is typically a time consuming process.

According to some embodiments, the beam selection time is reduced by doing a pairwise search, where at each step the calculations are done for a single transmit receive antenna array pair and its beams. This is in contrast to exhaustive search, where at each step the calculation is done for the overall beam combination where one beam from each antenna array is considered. Although faster than exhaustive search, matching antenna arrays one pair at a time has the potential to perform poorly, as fixing one beam pair at a stage has the potential to lead the rest of the search towards a significantly suboptimal path. The full determination of the beam combination is delayed by keeping more than one possible choice (M choices) at each stage and making the final decision over the kept (M) candidates. These M candidates may be chosen based on some predefined metric as discussed below. The M candidates may be the candidates with the most favorable values, which in some embodiments may be the highest values.

In some embodiments, a different metric is used at each stage of the proposed solution. For example, although the overall metric may be to maximize the achievable data rate, in the first stage of the algorithm the pairwise Signal-to-Noise Ratio (SNR) achieved by the array/beam pair under consideration can be used as a metric to choose the M candidates at that stage. This significantly reduces the computation burden compared to the case where the data rate achieved by the overall MIMO channel is computed.

The value of M controls the computational complexity, and the probability of estimating the optimal or near optimal set of beam indices for use with transmissions from a transmitter to a receiver using hybrid precoding. For instance, as the value of M approaches one, the algorithm devolves into the pairwise search which is computationally efficient but suffers from arriving at a local maximum instead of a global maximum. Conversely, as the value of M approaches the full list of candidates, then the algorithm devolves into an exhaustive search which is guaranteed to find the global maximum for the metric but may be computationally prohibitive.

In some embodiments, the value of M may be different for different levels of the decision tree as discussed in more detail below. Also, in some embodiments, instead of or in addition to selecting a specific number of candidates, there may instead be a threshold value for the metric. In some embodiments, as discussed in more detail below, prior information may be used to prune candidates, perhaps without even calculating metrics for those candidates.

Consider a transmitter equipped with $L_T$ transmit antenna arrays and a receiver equipped with $L_R$ receive antenna arrays. Let $n_{T,i}$ be the number of antennas in the $i^{th}$ transmit antenna array, for $i=1, 2, \ldots, L_T$, and $n_{R,j}$ be the number antennas in the $j^{th}$ receive antenna array, for $j=1, 2, \ldots, L_R$. FIG. 2 shows a special case with $L_T=L_R=2$. Let $G_{ij}$ denote the MIMO channel from the $j^{th}$ transmit antenna array to the $i^{th}$ receive antenna array. Let $$G = \begin{bmatrix} G_{11} & G_{12} & \cdots & G_{1L_T} \\ G_{21} & G_{22} & \ddots & G_{2L_T} \\ \vdots & \ddots & \ddots & \vdots \\ G_{L_R1} & G_{L_R2} & \cdots & G_{L_RL_T} \end{bmatrix}$$

denote the $n_R = \sum_{i=1}^{L_R} n_{R,i}$ by $n_T = \sum_{i=1}^{L_T} n_{T,i}$ full MIMO channel response from all transmit arrays to all receive arrays, where $n_T$ and $n_R$ denote the number of transmit and receive antennas, respectively.

Let $C_{T,k} = \{p_{T,k}^{(1)}, p_{T,k}^{(2)}, \ldots, p_{T,k}^{(B_{T,k})}\}$ and $C_{R,l} = \{p_{R,l}^{(1)}, p_{R,l}^{(2)}, \ldots, p_{R,l}^{(B_{R,l})}\}$ be the codebooks of beams (or beam directions) for the $k^{th}$ transmit and $l^{th}$ receive antenna array, respectively, where $B_{T,k}$ and $B_{R,l}$ denote the number of beams in the codebooks $C_{T,k}$ and $C_{R,l}$, respectively. Each transmit beam $p_{T,k}^{(i)}$ is an $n_{T,k}$-by-1 (column) vector of beamforming weights, and each receive beam $p_{R,l}^{(j)}$ is a $n_{R,l}$-by-1 (column) vector of beamforming weights. For a given index $i_k$ of the beam in $C_{T,k}$ selected for the $k^{th}$ transmit antenna array, and a given index $j_l$ of the beam in $C_{R,l}$ selected for the $l^{th}$ receive antenna array, the baseband signal processor sees a composite effective MIMO channel response given by:

$$H(i,j) = W_{RF}(j)^H G F_{RF}(i)$$

where $i \equiv (i_1, i_2, \ldots, i_{L_T})$, $j \equiv (j_1, j_2, \ldots, j_{L_R})$, $A^H$ denotes the conjugate transpose of matrix $A$, and where $$W_{RF}(j) = \begin{bmatrix} p_{R,1}^{(j_1)} & 0 & \cdots & 0 \\ 0 & p_{R,2}^{(j_2)} & \ddots & \vdots \\ \vdots & \ddots & \ddots & 0 \\ 0 & \cdots & 0 & p_{R,L_R}^{(j_{L_R})} \end{bmatrix}$$

and $$F_{RF}(i) = \begin{bmatrix} p_{T,1}^{(i_1)} & 0 & \cdots & 0 \\ 0 & p_{T,2}^{(i_2)} & \ddots & \vdots \\ \vdots & \ddots & \ddots & 0 \\ 0 & \cdots & 0 & p_{T,L_T}^{(i_{L_T})} \end{bmatrix}$$

are the combined receive and transmit beams over all receive and transmit antenna arrays, respectively. $F_{RF}(i)$, $W_{RF}(j)$ are also called the "analog precoder matrix", and the "analog combiner matrix", respectively. It is to be noted that the composite channel matrix $H$ is of size $L_R \times L_T$, and its element in the $l^{th}$ row and $k^{th}$ column, $h_{lk}$, depends on the beam indices $i_k$ and $j_l$, and the channel matrix $G_{lk}$. Given the full channel matrix $G$, the dependence of the composite channel $H$ on the beam indices can be seen more clearly in the following:

$$H(i,j) = \begin{bmatrix} h_{11}(i_1, j_1) & \cdots & h_{1L_R}(i_1, j_{L_R}) \\ \vdots & \ddots & \vdots \\ h_{L_R1}(i_1, j_{L_R}) & \cdots & h_{L_RL_T}(i_{L_T}, j_{L_R}) \end{bmatrix}$$

For convenience, we also define the composite channel matrix $H_{A,B}$ seen between a subset $A$ of transmit arrays and a subset $B$ of receive arrays, $A \subset \{1, 2, \ldots, L_T\}$, $B \subset \{1, 2, \ldots, L_R\}$.

Beam selection, also called beam training, is the process where the transmitter and the receiver try to identify the best analog beamformers for subsequent communication. It is usually preceded by a channel estimation stage where the transmitter sends known reference symbols over all its transmit antennas and transmit beams, and the receiver listens on all receive antennas and receive beams to estimate all possible composite channel entries $h_{lk}(i_k, j_l)$, for all $l$, $k$, $i_k$, $j_l$. Unlike the beam selection process that follows, the channel estimation process takes linear time in the number of antenna arrays. Once these channel entry values are found, beam selection is the process of solving the following optimization problem:

$$i^*, j^* = \underset{i,j}{\operatorname{argmax}} \mu(H(i,j))$$

The optimization metric $\mu$ can vary depending on the MIMO application, e.g., it can be the achievable data rate, or the reliability of communication, etc. It is to be noted that the number of possible beam combinations is:

$$\prod_{k=1}^{L_T} B_{T,k} \prod_{l=1}^{L_R} B_{R,l},$$

which is the number of times $\mu(H(i,j))$ needs to be calculated for an exhaustive search. For simplicity, consider the case where all transmit beam codebooks have the same number of beams $B_T = B_{T,k}$, $\forall k$, and all receive beam codebooks have the same number of beams $B_R = B_{R,l}$, $\forall l$. Then the number of calculations necessary is $B_T^{L_T} B_R^{L_R}$. Hence, an exhaustive search requires a number of computations that scale exponentially in the number of antenna arrays. Such a search may take too long to be feasible in practice.

As discussed above, in some embodiments, a pairwise search is performed instead of checking beam combinations from all arrays at once. For example, in the first stage, or first level, all possible transmit-receive antenna array pairs are checked for their pairwise performance, e.g., the received signal strength, assuming all other arrays are inactive. Once the array pair that gives the best performance (along with the beam pair that achieves this) is found, the first "matching" is done. Similarly, at each stage, the next transmit-receive array "matching" is done by scanning the remaining pairs. In general, the performance evaluation at each stage takes into account all the pairs matched thus far, but the current disclosure is not limited thereto.

More specifically, in the first stage the following optimization is solved:

$$\{(k^*, i_{k^*}^*), (l^*, j_{l^*}^*)\} = \underset{k,i_k,l,j_l}{\operatorname{argmax}} \mu_1(h_{lk}(i_k, j_l))$$

where $\mu_1$ is the metric used in the first stage of the beam selection. In the case where $B_T=B_{T,k}, \forall k$, and $B_R=B_{R,l}, \forall l$, it is to be noted that the above optimization problem requires $L_T L_R B_T B_R$ calculations.

In the second stage, the second antenna array pair matching is done by solving the following:

$$\{(m^*, i_{m^*}^*), (n^*, j_{n^*}^*)\} = \underset{m, i_m, n, j_n}{\mathrm{argmax}} \mu_2(H_{\{k,m\},\{l,n\}}(i_{k^*}^*, i_m, j_l^*, j_n)),$$

where $\mu_2$ is the metric used in the second stage. This stage requires $(L_T-1)(L_R-1)B_T B_R$ calculations. In general, the $r^{th}$ stage takes:

$$\max\{1, L_T-r+1\} \max\{1, L_R-r+1\} B_T B_R$$

calculations, $r=1, \ldots, \max\{L_T, L_R\}$. The performance metric $\mu_r$ for the $r^{th}$ stage can be chosen by taking the overall performance metric $\mu$ and complexity considerations into account.

The beam search completes when all antenna arrays are assigned a beam, which takes $\max\{L_T, L_R\}$ stages.

Figure 4:
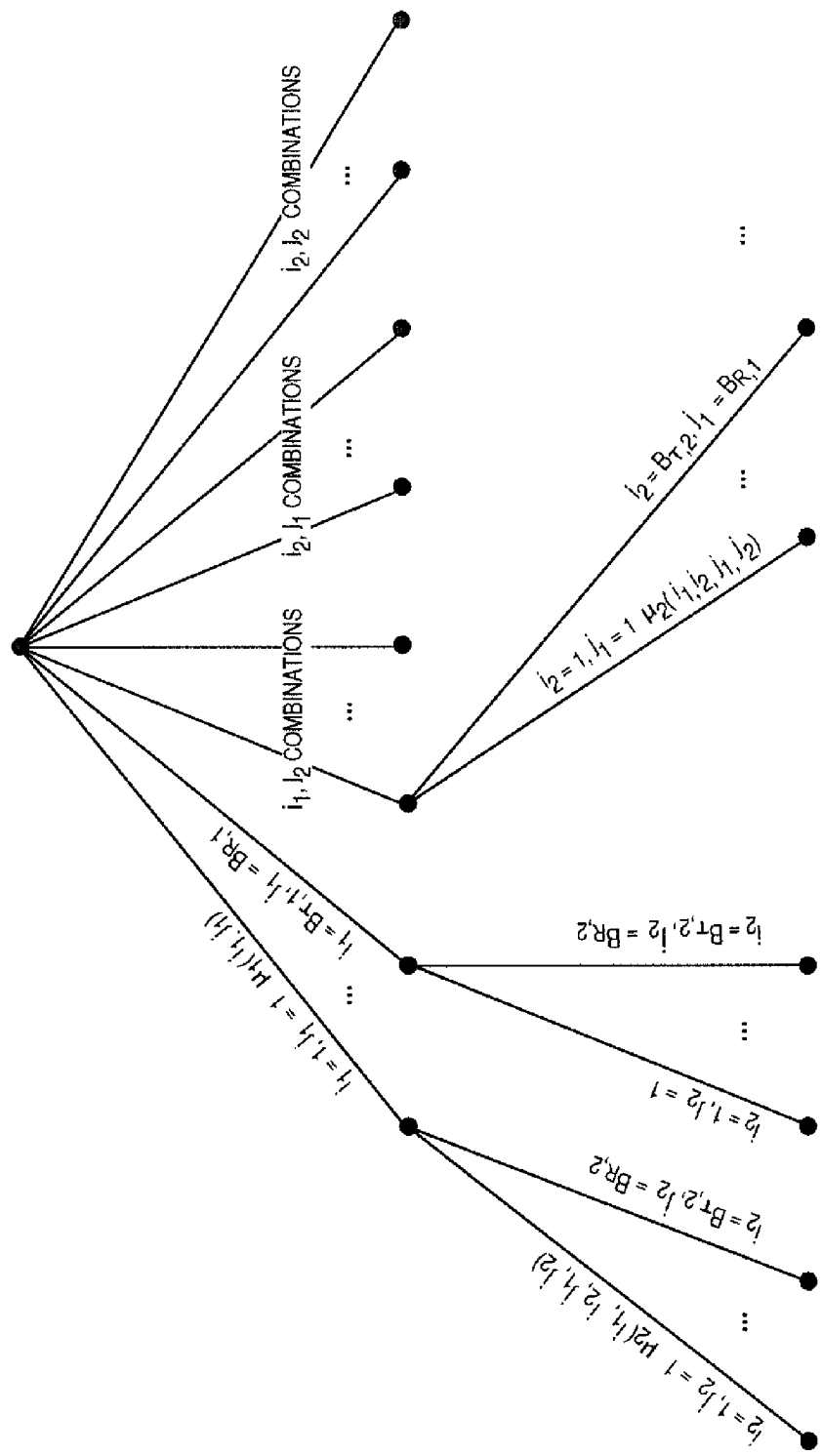
FIG. 4 illustrates a decision tree of pairs of beam indices, according to some embodiments of the present disclosure.

FIG. 4 illustrates a decision tree of pairs of beam indices, according to some embodiments of the present disclosure. The pairwise beam search described above can be conveniently described on a tree as shown in FIG. 4 for the special case $L_T=2$, $L_R=2$. Each level of the tree corresponds to one stage of the algorithm. The root of the tree has $L_T L_R B_T B_R$ children. This is the number of computations required in the first stage of the algorithm. Further, each child of the root node has $(L_T-1)(L_R-1)B_T B_R$ children. In general, each node in the $r^{th}$ level has:

$$\max\{1, L_T-r+1\} \max\{1, L_R-r+1\} B_T B_R$$

children. In some embodiments, each edge is assigned a weight that corresponds to the value of the performance metric evaluated for the corresponding stage of the algorithm. The proposed beam search algorithm corresponds to a search on this tree. Starting at the root node, at each level, the edges leading to all children of the current node are checked, the edge with the optimal weight is found, and the search moves on to the child node to which the selected edge leads.

It is to be noted that in the above description, at each stage one array/beam pair is matched, i.e., the search fixes a pair (finalizes the decision for that array pair) before moving onto the next stage. In general, this may lead the search down a significantly suboptimal path. In some embodiments of the present disclosure, instead of finding only the best edge to move on to the next node, a list of multiple, say M, best edges are found at each level and the search moves to the next M children. In the end, when all the levels are traversed, the best beam combination among the M candidates is chosen. This is referred to as the "M-algorithm". As discussed above, it is to be noted that when $M=B_T^{L_T} B_R^{L_R}$, the search becomes equivalent to an exhaustive search.

By keeping M candidates at each stage, the number of calculations increases by a factor of M. However, this is a linear increase which is better than the exponential increase of the exhaustive algorithm. More importantly, due to mmW spatial channel properties and narrow beam patterns, it is expected that most beams in the codebook do not result in any significant signal strength. Hence, even a very small value of M can be enough to select the same optimal beams found by exhaustive search, or one with a close to optimal metric.

Figure 5:
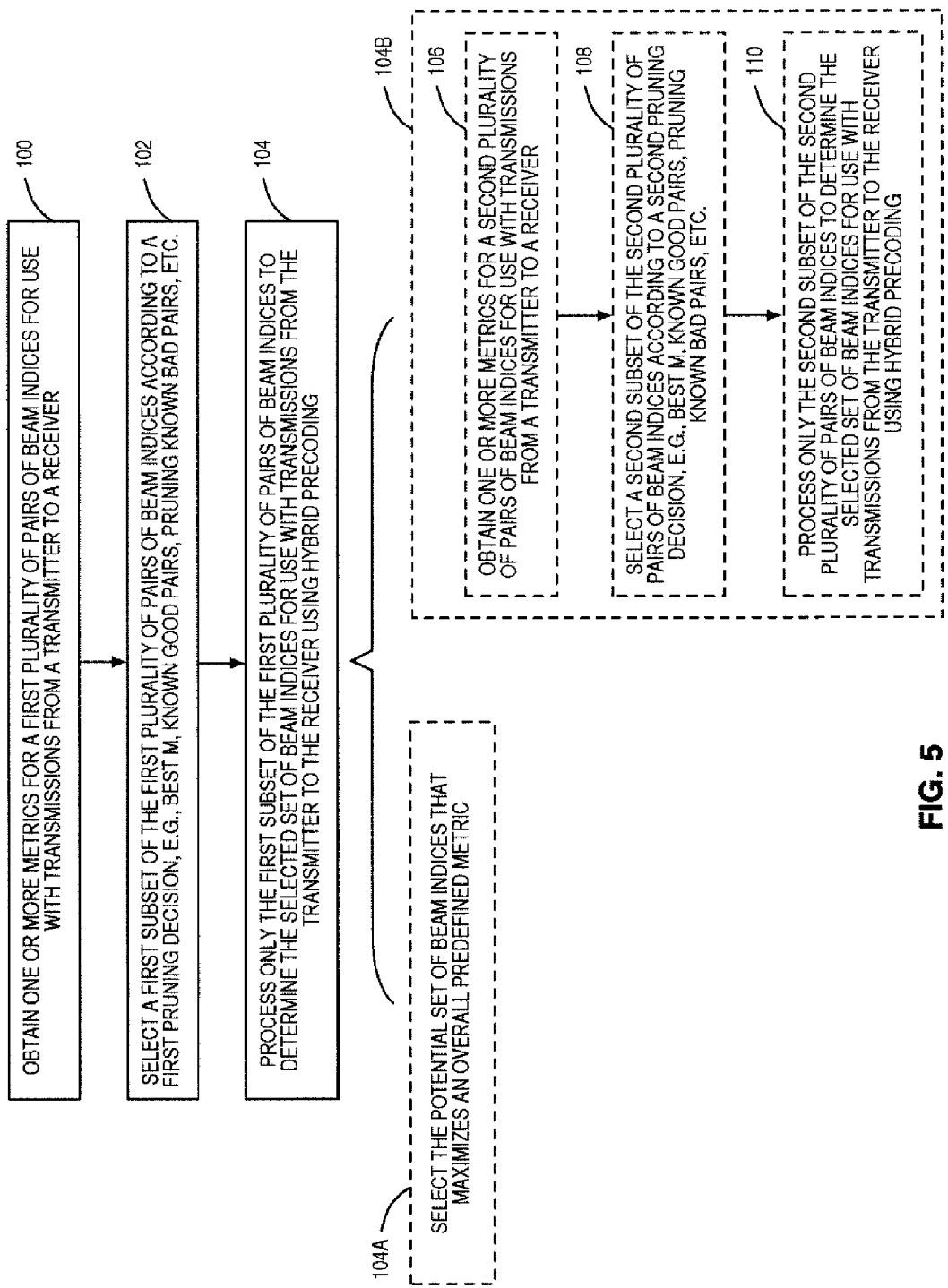
FIG. 5 illustrates a process for identifying a set of beam indices for use with transmissions, according to some embodiments of the present disclosure.

FIG. 5 illustrates a process for identifying a set of beam indices for use with transmissions, according to some embodiments of the present disclosure. This process will be discussed in relation to the receiver 14 performing the various steps. However, the current disclosure is not limited thereto. In some embodiments, this process, or a similar process may be performed by both the transmitter 12 and the receiver 14. In other embodiments, the process may be performed by the transmitter 12 and the results maintained internally for use with transmissions and/or communicated to the receiver 14. In this case, the transmitter 12 needs to first be provided with feedback of the measurements, observations, etc. done by the receiver 14.

Returning to FIG. 5, the receiver 14 obtains one or more metrics for a first set of pairs of beam indices for use with transmissions from a transmitter to a receiver (step 100). In some embodiments, this may be obtained by searching all of the pairs of beams, while in other embodiments this may include the use of prior information where only some of the pairs of beams are searched, as discussed above. As an example, in the 2×2 case where there are 16 possible beams for each antenna array, there are 256*4=1024 pairs of beam indices. Prior information may be used to eliminate, for example, 124 of the beam pairs right away without performing any measurements or calculations. Then, in all subsequent decisions, those 124 pairs of beam indices are removed from consideration and only the 900 remaining beam pairs are considered. The receiver 14 then selects a first subset of the first set of pairs of beam indices according to a first pruning decision (step 102). As discussed above, this pruning decision may include one or more of selecting the best M candidates, selecting all candidates surpassing a predefined metric threshold, including known (or suspected) good pairs, excluding known (or suspected) bad pairs, etc.

The receiver 14 then proceeds to process only the first subset of the first set of pairs of beam indices to determine the selected set of beam indices for use with transmissions from the transmitter 12 to the receiver 14 using hybrid precoding (step 104). In some embodiments that may only include two stages or levels, Step 104 may include selecting the potential set of beam indices that maximizes an overall predefined metric (step 104A).

In other embodiments where more than two stages are needed, Step 104 may include determining one or more additional levels of the decision tree (step 104B). This may include obtaining one or more metrics for a second set of pairs of beam indices for use with transmissions from a transmitter to a receiver (step 106) and selecting a second subset of the second set of pairs of beam indices according to a second pruning decision (step 108). This pruning decision may include any of the embodiments discussed above in relation to the first pruning decision. Also, while the two pruning decisions may be the same, they are not required to be. Also, in some embodiments, one or more of the pruning decisions may include all candidates at a particular level.

The receiver 14 then processes only the second subset of the second set of pairs of beam indices to determine the selected set of beam indices for use with transmissions from the transmitter 12 to the receiver 14 using hybrid precoding (step 110). In some embodiments, the second set of pairs of beam indices for use with transmissions from the transmitter 12 to the receiver 14 includes multiple groups of pairs of beam indices where each group corresponds to a respective one of the pairs of beam indices in the first subset of the first set of pairs of beam indices. In some embodiments, the decision process is continued for additional levels of the decision tree until all beam indices are chosen and the selected set of beam indices for use with the transmissions from the transmitter 12 to the receiver 14 using hybrid precoding is known.

Figure 6:
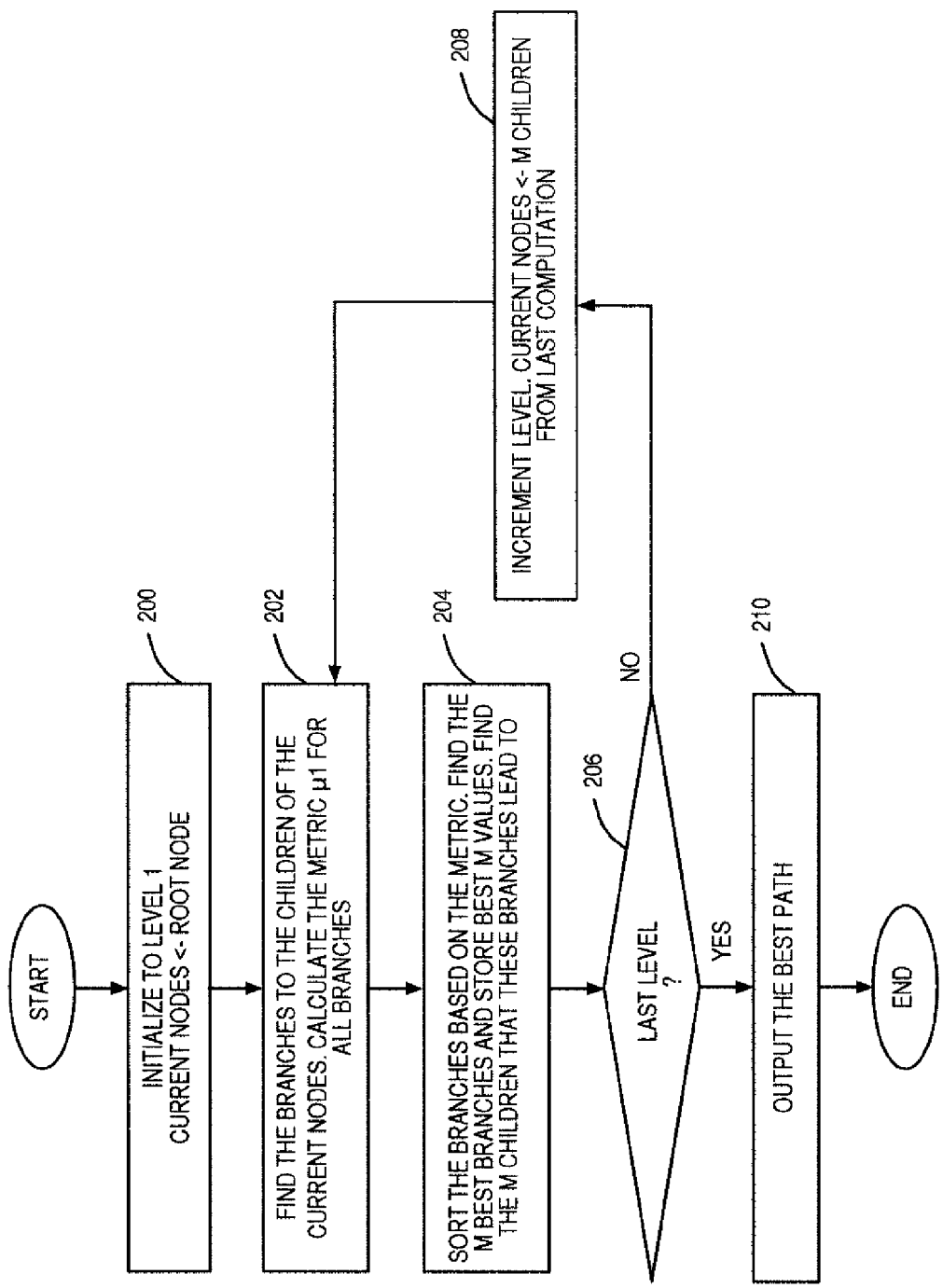
FIG. 6 illustrates a process for identifying a set of beam indices for use with transmissions using a pruned decision tree, according to some embodiments of the present disclosure.

The use of a decision tree and referring to the steps as pruning is an illustrative way of describing the processes. While the current disclosure is not limited thereto, FIG. 6 illustrates a process for identifying a set of beam indices for use with transmissions using a pruned decision tree using the M-algorithm, according to some embodiments of the present disclosure. First, the receiver 14 initializes the process to level one and sets the current nodes equal to the root node (step 200). The receiver 14 finds branches to the children of the current nodes (only the root node for level one) and calculates the metric $\mu_1$ for all branches (step 202).

The receiver 14 then sorts the branches based on the metric value, finds the M best branches and stores the best M values, and finds the M children that these branches lead to (step 204). If this is the last level (step 206), then the receiver 14 outputs the best path through the decision tree (step 210). As discussed above, in some embodiments, the metrics at each level may include the values of the node from which a branch descends. In these embodiments, determining the best path may only require looking at the metrics for the final branches. However, in other embodiments, the metrics on a given level may be independent of previous metric values. In those cases, the final decision may need to be made only after considering all the metric values for the beam pairs selected in some or all of the previous levels. On the pruned decision tree, this is equivalent to traversing each selected branch in the final level up to the root node.

If the receiver 14 is not yet at the last level, then the process continues. The receiver increments the value of the current level and sets the current nodes equal to the M children from the last computation (step 208). The process then returns to Step 202 to find the branches to the children of the current nodes and calculate a new metric for all branches.

As discussed above, in other embodiments of the described tree search include removing some edges in one or more levels before starting the search, i.e., "pruning the tree", to reduce the number of calculations. For example, in the first stage, the edges corresponding to the beam pairs that result in a received signal strength below a certain threshold can be removed. Another way to remove edges may be using prior information. For example, after the initial beam search is done, in subsequent beam searches between the same devices, some beam pairs may be ignored based on knowledge from prior beam searches. In some embodiments, having such empirical knowledge allows a device such as the receiver 14 to rank beams with a weighting factor. The higher the weighting factor, the more likely this beam was used with previous transmissions and the more likely that it will be included in the next search.

Additional information may also help to predict the most suitable beams. Such information may come from positioning systems used in smartphones that combine sensor input from accelerometers with electronic compass and global satellite navigation systems. As an example, a smartphone may measure the user's current trajectory of movement to predict the direction the user carries his devices. Based on such knowledge, certain beams may receive very low weights or might not be considered at all. Another example may be to consider the current status of the device. If a screensaver is in operation, a screen is dimmed, or keyboard backlight is off, this may indicate the user is not active and latency requirements may be reduced. Hence, an exhaustive beam search may be performed to update the device's database of preferred beams.

Figure 7:
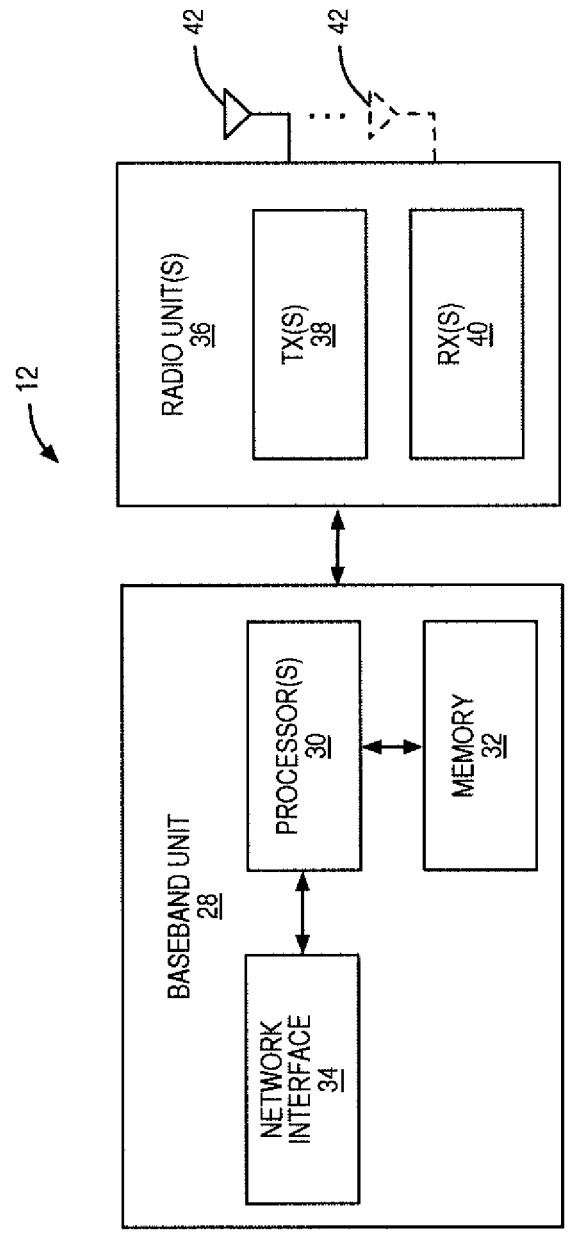
FIG. 7 is a diagram of a transmitter according to some embodiments of the present disclosure.

FIG. 7 is a diagram of a transmitter 12 according to some embodiments of the present disclosure. In some embodiments, transmitter 12 may be a base station such as an eNodeB. In other embodiments, the transmitter 12 may be a Wireless Local Area Network (WLAN) Access Point (AP) or a Personal Basic Service Set (PBSS) Control Point (PCP). In some embodiments, the transmitter 12 is communicating using hybrid precoding and is using mmW technology such as the IEEE 802.11ay standard.

In some embodiments, the transmitter 12 includes circuitry containing instructions, which when executed, cause the transmitter 12 to implement the methods and functionality described herein. In one example, the circuitry can be in the form of processing means which may include a processor and a memory containing instructions. As illustrated, the transmitter 12 includes a baseband unit 28 that includes at least one processor 30 and memory 32. The baseband unit 28 also includes a network interface 34. As illustrated, the transmitter 12 also includes at least one radio unit 36 with one or more transmitters 38, one or more receivers 40, and one or more antennas 42. In some embodiments, the transmitter 12, or the functionality of the transmitter 12 described with respect to any one of the embodiments described herein, is implemented in software that is stored in, e.g., the memory 32 and executed by the processor 30. The network interface 34 may include one or more components (e.g., network interface card(s)) that connect the transmitter 12 to other systems.

In some embodiments, a computer program including instructions which, when executed by the at least one processor 30, causes the at least one processor 30 to carry out the functionality of the transmitter 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 8:
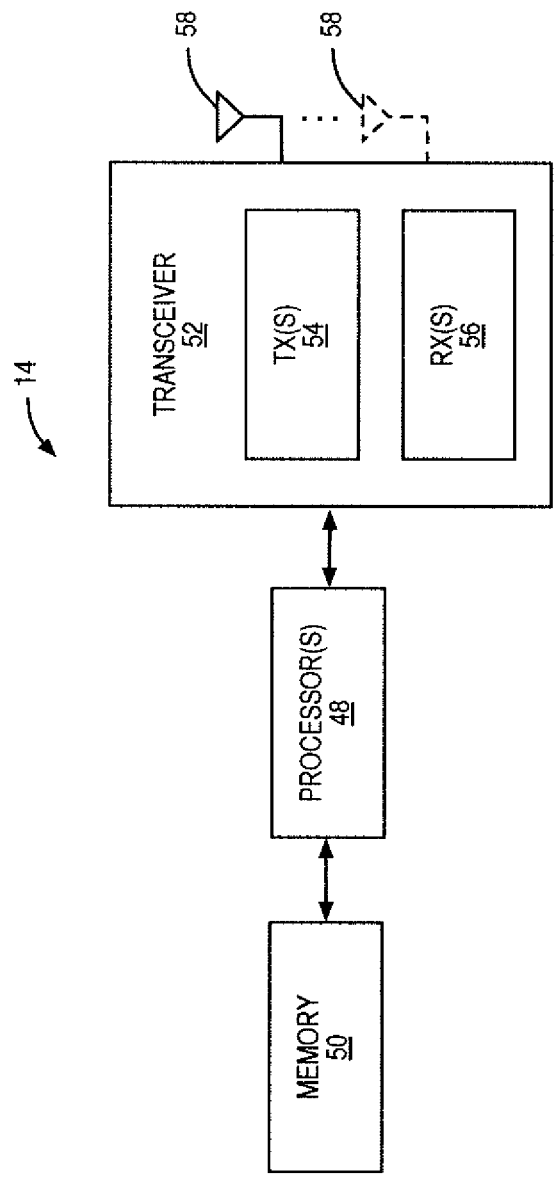
FIG. 8 is a diagram of a receiver according to some embodiments of the present disclosure.

FIG. 8 is a diagram of a receiver 14 according to some embodiments of the present disclosure. In some embodiments, receiver 14 may be a wireless device such as a User Equipment (UE). In other embodiments, the receiver 14 may be a WLAN station or client. In some embodiments, the receiver 14 is communicating using hybrid precoding and is using mmW technology such as the IEEE 802.11ay standard.

As illustrated, the receiver 14 includes at least one processor 48 and memory 50. The receiver 14 also includes a transceiver 52 with one or more transmitters 54, one or more receivers 56, and one or more antennas 58. In some embodiments, receiver 14, or the functionality of the receiver 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the receiver 14 to other systems.

In some embodiments, a computer program including instructions which, when executed by at least one processor 48, causes the at least one processor 48 to carry out the functionality of the receiver 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 9:
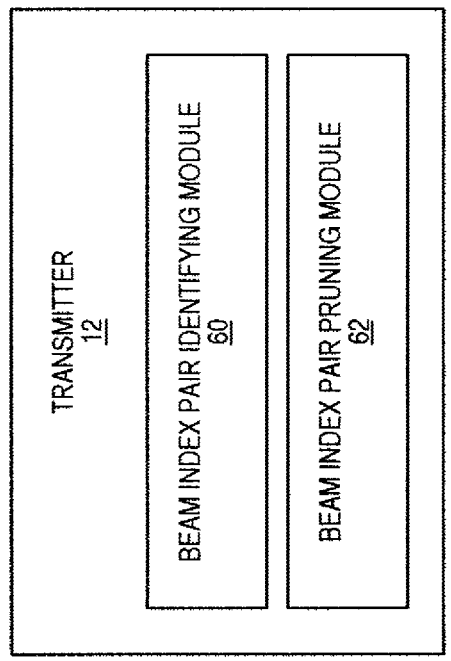
FIG. 9 is a diagram of a transmitter including modules according to some embodiments of the present disclosure.

FIG. 9 is a diagram of a transmitter 12 including a beam index pair identification module 60 and a beam index pair pruning module 62, according to some embodiments of the present disclosure. The beam index pair identification module 60 and the beam index pair pruning module 62 are each implemented in software that, when executed by a processor of the transmitter 12, causes the transmitter 12 to operate according to one of the embodiments described herein. The beam index pair identification module 60 operates to obtain one or more metrics for a first set of pairs of beam indices for use with transmissions from the transmitter 12 to the receiver 14, where each pair of beam indices includes a transmit beam index for an antenna of the transmitter 12 and a receive beam index for an antenna of the receiver 14, as described above. The beam index pair pruning module 62 operates to select a first subset of the first set of pairs of beam indices according to a first pruning decision, where the first subset includes at least one but not all of the first set of pairs of beam indices and process only the first subset of the first set of pairs of beam indices to determine the selected set of beam indices for use with the transmissions from the transmitter 12 to the receiver 14 using hybrid precoding, as described above.

Figure 10:
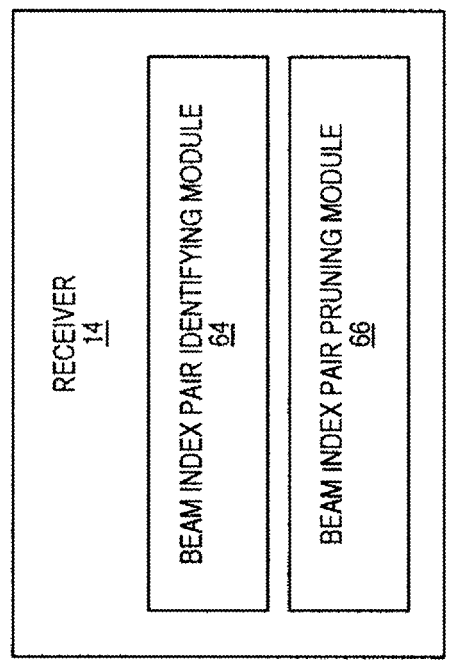
FIG. 10 is a diagram of a receiver including modules according to some embodiments of the present disclosure.

FIG. 10 is a diagram of a receiver 14 including a beam index pair identification module 64 and a beam index pair pruning module 66, according to some embodiments of the present disclosure. The beam index pair identification module 64 and the beam index pair pruning module 66 are each implemented in software that, when executed by a processor of the receiver 14, causes the receiver 14 to operate according to one of the embodiments described herein. The beam index pair identification module 64 operates to obtain one or more metrics for a first set of pairs of beam indices for use with transmissions from the transmitter 12 to the receiver 14, where each pair of beam indices includes a transmit beam index for an antenna of the transmitter 12 and a receive beam index for an antenna of the receiver 14, as described above. The beam index pair pruning module 66 operates to select a first subset of the first set of pairs of beam indices according to a first pruning decision, where the first subset includes at least one but not all of the first set of pairs of beam indices and process only the first subset of the first set of pairs of beam indices to determine the selected set of beam indices for use with the transmissions from the transmitter 12 to the receiver 14 using hybrid precoding, as described above.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the current disclosure is not limited to the embodiments described but can be practiced with modification and alteration within the spirit and scope of the appended claims. The description is thus to be regarded as illustrative instead of limiting.

The following acronyms are used throughout this disclosure.

3G 3$^{rd}$ Generation
3GPP 3$^{rd}$ Generation Partnership Project
4G 4$^{th}$ Generation
5G 5$^{th}$ Generation
BB Baseband
BF Beamforming
eNode B Enhanced Node B
Gbps Gigabits per second
GHz Gigahertz
HDMI High-Definition Multimedia Interface
IEEE Institute of Electrical and Electronics Engineers
LTE Long Term Evolution
LTE-A Long Term Evolution-Advanced
MIMO Multiple-Input Multiple-Output
mmW millimeter Wave
MU-MIMO Multi-User MIMO
PBSS Personal Basic Service Set
PCP Personal Basic Service Set Control Point
RF Radio Frequency
SINR Signal-to-Interference-plus-Noise Ratio
SNR Signal-to-Noise Ratio
UE User Equipment
UMTS Universal Mobile Telecommunications System
USB Universal Serial Bus
WiMAX Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of determining a select set of beam indices for use with transmissions from a transmitter to a receiver using hybrid precoding, comprising:
    obtaining one or more metrics for a first plurality of pairs of beam indices for use with the transmissions from the transmitter to the receiver, where each pair of beam indices includes a transmit beam index for an antenna of the transmitter and a receive beam index for an antenna of the receiver;
    selecting a first subset of the first plurality of pairs of beam indices according to a first pruning decision, where the first subset includes at least one of the first plurality of pairs of beam indices;
    obtaining one or more metrics for a second plurality of pairs of beam indices for use with the transmissions from the transmitter to the receiver for the pairs of beam indices in the first subset of the first plurality of pairs of beam indices, where each pair of beam indices in the second plurality of pairs of beam indices together with a respective one of the pairs of beam indices in the first subset of the first plurality of pairs of beam indices forms a potential set of beam indices;
    selecting a second subset of the second plurality of pairs of beam indices according to a second pruning decision, where the second subset includes at least one of the second plurality of pairs of beam indices; and
    processing only the second subset of the second plurality of pairs of beam indices to determine the selected set of beam indices for use with the transmissions from the transmitter to the receiver using hybrid precoding.

2. The method of claim 1 wherein processing only the second subset of the second plurality of pairs of beam indices to determine the selected set of beam indices for use with the transmissions from the transmitter to the receiver using hybrid precoding comprises selecting the potential set of beam indices that maximizes an overall predefined metric.

3. The method of claim 1 wherein:
obtaining the one or more metrics for the first plurality of pairs of beam indices and selecting the first subset of the first plurality of pairs of beam indices are comprised in determining a first level of a decision tree;
obtaining the one or more metrics for the second plurality of pairs of beam indices and selecting the second subset of the second plurality of pairs of beam indices are comprised in determining a second level of the decision tree; and
processing only the second subset of the second plurality of pairs of beam indices to determine the selected set of beam indices for use with the transmissions from the transmitter to the receiver using hybrid precoding comprises determining one or more additional levels of the decision tree.

4. The method of claim 1 wherein the second plurality of pairs of beam indices for use with the transmissions from the transmitter to the receiver comprises multiple groups of pairs of beam indices where each group of the multiple groups of pairs of beam indices corresponds to the respective one of the pairs of beam indices in the first subset of the first plurality of pairs of beam indices.

5. The method of claim 4 wherein selecting the first subset of the first plurality of pairs of beam indices according to the first pruning decision comprises selecting a predefined number, M, of the first plurality of pairs of beam indices that have the most favorable values of a first predefined metric for the first plurality of pairs of beam indices.

6. The method of claim 4 wherein selecting the first subset of the first plurality of pairs of beam indices according to the first pruning decision comprises selecting the first subset of the first plurality of pairs of beam indices using prior information regarding the first plurality of pairs of beam indices.

7. The method of claim 6 wherein the prior information regarding the first plurality of pairs of beam indices includes an indication of one or more known good pairs of the first plurality of pairs of beam indices and selecting the subset of the first plurality of pairs of beam indices further comprises including the one or more known good pairs.

8. The method of claim 7 wherein the prior information regarding the first plurality of pairs of beam indices includes an indication of one or more known bad pairs of the first plurality of pairs of beam indices and selecting the first subset of the first plurality of pairs of beam indices further comprises excluding the one or more known bad pairs.

9. The method of claim 7 wherein the prior information regarding the first plurality of pairs of beam indices includes a weighting factor for one or more pairs of the first plurality of pairs of beam indices and selecting the first subset of the first plurality of pairs of beam indices further comprises selecting a predefined number, M, of the first plurality of pairs of beam indices that have most favorable values of a first predefined metric for the first plurality of pairs of beam indices where the values of the first predefined metric are weighted with the weighting factor for the one or more pairs.

10. The method claim 9 wherein selecting the first subset of the first plurality of pairs of beam indices includes an search of all the pairs of beam indices.

11. The method of claim 10 wherein selecting the second subset of the second plurality of pairs of beam indices includes searching all of the pairs of beam indices based on the first subset of the first plurality of pairs of beam indices.

12. The method of claim 7 wherein at least the first predefined metric for the first plurality of pairs of beam indices is different from the second predefined metric for the set of beam indices.

13. The method of claim 12 wherein the first predefined metric is an indication of a signal strength for the transmission mode.

14. The method of claim 12 wherein the first predefined metric is an indication of a data throughput for the transmission mode.

15. The method of claim 14 wherein the transmitter and the receiver operate using a millimeter wave technology.

16. The method of claim 15 wherein the transmitter and the receiver operate according to the IEEE 802.11ay standard.

17. A receiver comprising:
a plurality of antennas; and
circuitry configured to:
obtain one or more metrics for a first plurality of pairs of beam indices for use with transmissions from the transmitter to the receiver, where each pair of beam indices includes a transmit beam index for an antenna of the transmitter and a receive beam index for an antenna of the receiver;
select a first subset of the first plurality of pairs of beam indices according to a first pruning decision, where the first subset includes at least one of the first plurality of pairs of beam indices;
obtain one or more metrics for a second plurality of pairs of beam indices for use with the transmissions from the transmitter to the receiver for the pairs of beam indices in the first subset of the first plurality of pairs of beam indices, where each pair of beam indices in the second plurality of pairs of beam indices together with a respective one of the pairs of beam indices in the first subset of the first plurality of pairs of beam indices forms a potential set of beam indices;
select a second subset of the second plurality of pairs of beam indices according to a second pruning decision, where the second subset includes at least one of the second plurality of pairs of beam indices; and
process only the second subset of the second plurality of pairs of beam indices to determine the selected set of beam indices for use with the transmissions from the transmitter to the receiver using hybrid precoding.

* * * * *